United States Patent [19]

Hine et al.

[11] Patent Number: 4,940,995
[45] Date of Patent: Jul. 10, 1990

[54] REMOVAL OF DISSOLVED GAS FROM INK IN AN INK JET SYSTEM

[75] Inventors: Nathan P. Hine, East Thetford, Vt.; Robert L. Wells, Jr., Hanover, N.H.

[73] Assignee: Spectra, Inc., Hanover, N.H.

[21] Appl. No.: 273,883

[22] Filed: Nov. 18, 1988

[51] Int. Cl.$^5$ .................. G01D 15/14; B01D 19/00
[52] U.S. Cl. .................................. 346/140 R; 210/188
[58] Field of Search ............ 346/140, 1.1; 210/188; 400/126; 55/159

[56] References Cited

U.S. PATENT DOCUMENTS

| | | | |
|---|---|---|---|
| 4,301,459 | 11/1981 | Isayama et al. | 346/140 |
| 4,460,904 | 7/1984 | Oszczakiewicz et al. | |
| 4,502,055 | 2/1985 | Horike et al. | |
| 4,571,599 | 2/1986 | Rezanka | |
| 4,729,773 | 8/1988 | Shirato et al. | 210/188 |

Primary Examiner—Mark J. Reinhart
Attorney, Agent, or Firm—Brumbaugh, Graves, Donohue & Raymond

[57] ABSTRACT

In the particular embodiment of a device for removing dissolved gas from ink described in the specification, an elongated ink path leading to an ink jet head is formed between two permeable fluorine-containing membranes. The membranes are backed by air plenums which contain support members to hold the membranes in position. Reduced pressure is applied to the plenums to extract dissolved gas from the ink in the ink path without accumulating scum on the membrane surfaces. Increased pressure can also be applied to the plenums to eject ink from the ink jet head for purging. Within the ink jet head, ink is circulated convectively from the orifice to the deaerating path even when the jet is not jetting ink.

10 Claims, 1 Drawing Sheet

REMOVAL OF DISSOLVED GAS FROM INK IN AN INK JET SYSTEM

BACKGROUND OF THE INVENTION

This invention relates to the removal of gas from ink in an ink jet system and, more particularly, to a new and improved method and apparatus for removing dissolved gas from ink in an ink jet system.

In the copending application of Hoisington et al., Ser. No. 043,372 filed Apr. 28, 1987, a method and apparatus for removing dissolved air from ink are disclosed. As described in that application, in many ink jet systems ink is supplied to a chamber or passage connected to an orifice from which the ink is ejected drop by drop as a result of successive cycles of decreased and increased pressure applied to the ink in the passage. If the ink introduced into the passage contains dissolved air or other gas, decompression of the ink during reduced-pressure portions of the pressure cycle may cause the dissolved gas to form small bubbles in the ink within the passage. Repeated decompression of the ink in the chamber causes these bubbles to grow and such bubbles can produce malfunction of the ink jet apparatus.

In order to overcome this difficulty in accordance with the above-identified copending application, the ink in the ink jet system is subjected to a reduced pressure applied through a membrane which is permeable to gas but not to ink. To apply the reduced pressure, the ink is conveyed to an ink jet head through a passage which communicates through a permeable membrane with a plenum maintained at a reduced air pressure. As described in that application, the membrane may be a flexible sheet material such as, for example, a 0.01-inch thick layer of medical-grade silicone sheeting, such as Dow-Corning SSFMEXD-174, now available from Dow-Corning under the designation "2174". It has been found, however, that certain types of gas-permeable, ink-impermeable sheet material, such as silicone sheeting, tend to have a small but finite permeability to certain low-molecular-weight components of the ink, permitting small amounts of such components to pass through the membrane and accumulate as a scum on the low-pressure side of the membrane. If the scum-like accumulation is not removed periodically, it will reduce the efficiency of the membrane in the gas removal process.

SUMMARY OF THE INVENTION

Accordingly, it is an object of the present invention to provide a new and improved deaeration method and apparatus for an ink jet system which overcomes the above-mentioned disadvantages of the prior art.

Another object of the invention is to provide a membrane for removing dissolved gas from ink in an ink jet system which avoids collection of scum.

These and other objects of the invention are attained by subjecting ink in an ink jet system to a reduced pressure applied through a membrane made of a fluorine-containing material which is permeable to gas but not to ink. Surprisingly, the use of a fluorine-containing material prevents or inhibits the permeation of low-molecular-weight ink components and thereby inhibits the formation of scum which tends to accumulate on membranes made of other materials when used to remove dissolved gas from ink in an ink jet system. Preferred membrane materials are fluorosilicone and Teflon. To eliminate the tendency of such fluorine-containing materials to resist bonding which may be required in the assembly of the apparatus, the surface of a fluorine-containing membrane may be etched without affecting the scum-inhibiting property of the fluorine-containing membrane.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENT

Figure 1:
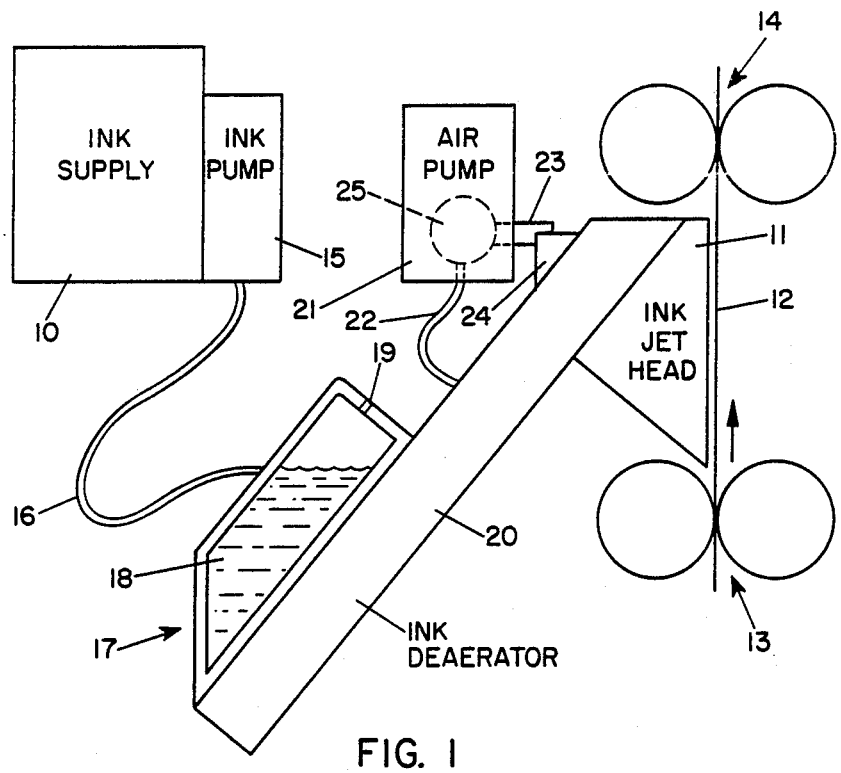
FIG. 1 is a block diagram, partly in section, schematically illustrating a representative embodiment of an ink jet ink supply system including an arrangement for removing dissolved gas in accordance with the present invention.

In the typical embodiment of the invention illustrated in the drawings, an ink jet apparatus includes an ink supply reservoir 10 holding liquid ink for use in an ink jet head 11 from which ink is ejected to produce a desired pattern on a sheet or web 12 of paper or other image support material in the usual manner. The ink jet head 11 is supported by conventional means for reciprocal motion transverse to the web 12, i.e., perpendicular to the plane of FIG. 1, and the web is transported by two sets of drive rolls 13 and 14 in the direction indicated by the arrow past the ink jet head.

The ink supply system includes an ink pump 15 for transferring ink from the ink supply 10 through a flexible supply line 16 to a reservoir 17 which is supported for motion with the ink jet head 11. If hot melt ink is used in the ink jet apparatus, the ink supply system may be of the type described in the Hine et al. U.S. Pat. application Ser. No. 043,369, filed Apr. 28, 1987, for "Hot Melt Ink Supply System", assigned to the same assignee as the present application. In that ink supply system, ink is transferred from the ink supply 10 to the reservoir 17 only when the level of the ink 18 in the reservoir is low.

To maintain the ink in the reservoir 17 at atmospheric pressure, a vent 19 is provided. Accordingly, the ink 18 standing in the reservoir 17 contains air even if the ink was protected from air in the ink supply 10. Moreover, when hot melt inks are used, as much as 20% by volume of air may be dissolved in the ink. If ink containing such dissolved air is subjected to the periodic decompression which takes place in the ink jet head 11, air bubbles can form in the ink, causing failures in the operation of the ink jet head.

To overcome this problem in accordance with the present invention, a device 20 for removing dissolved gas is provided in the ink supply path between the reservoir 17 and the ink jet head 11. An air pump 21 is connected through a flexible air line 22 to provide increased or reduced air pressure to the device 20. The dissolved-gas removal device 20 is mounted for reciprocal motion with the ink jet head 11 and the reservoir 17 and, in the illustrated embodiment, the air pump 21 is operated by engagement of a projectable pump lever 23 with a projecting lug 24 on the device 20 during the reciprocal motion of the ink jet head. The pump lever 23 is projected from the pump 21 only when negative or positive pressure is required.

The pump lever 23 is connected to a piston 25 within the pump which is arranged so that, if negative pressure is to be provided to the dissolved-gas removal device 20, the pump lever will be projected from the pump 21 so as to be engaged by the lug 24 during motion of the device in one direction, causing the piston to move in a direction to apply reduced pressure through the line 22, after which the piston may be locked in position. If increased pressure is to be applied to the device 20, the lever 23 is projected from the device 21 so as to be moved with the piston 25 in the opposite direction by the lug 24.

Figure 2:
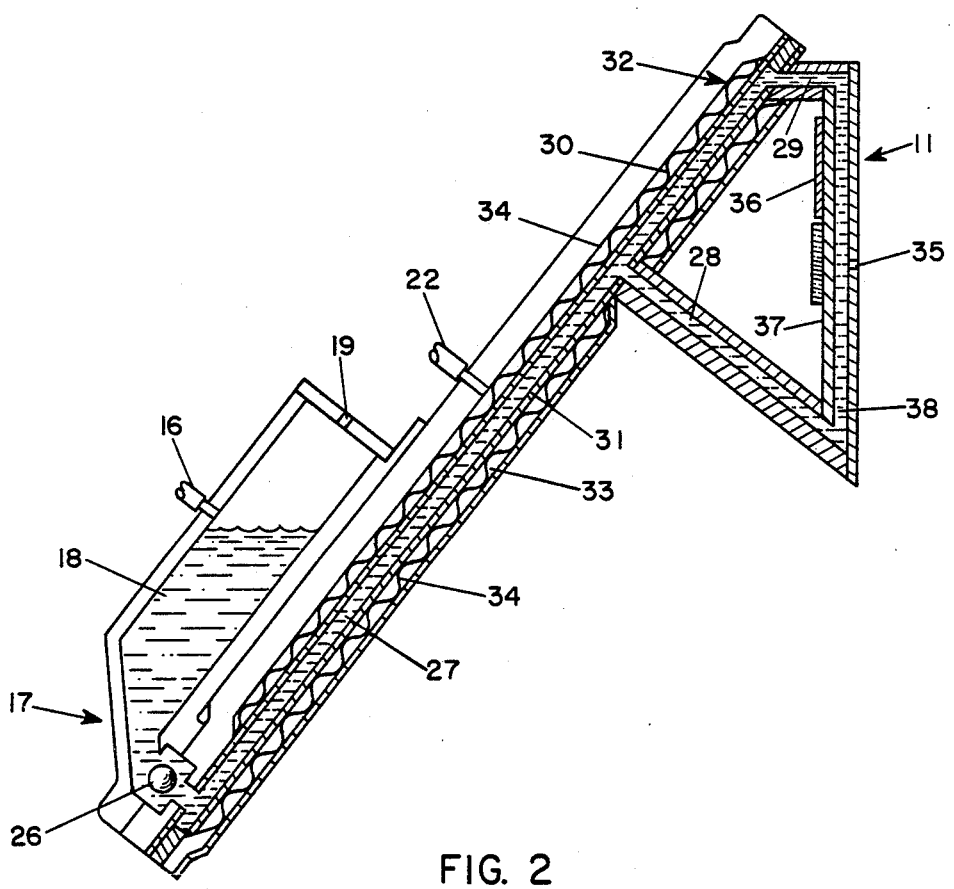
FIG. 2 is an enlarged cross-sectional view of the arrangement for removing dissolved gas used in the ink supply system of FIG. 1.

The internal structure of the dissolved-gas removal device 20 and the ink jet head 11 is shown in the sectional view of FIG. 2. At the lower end of the reservoir 17, a check valve 26 is arranged to permit ink to pass from the reservoir to a narrow elongated gas removal passage 27 which leads to two passages 28 and 29 in the ink jet head 11 through which ink is supplied to the head. In a particular embodiment, the passage 27 is about 0.04 inch thick, 0.6 inch wide and 3.5 inches long and is bounded by parallel walls 30 and 31 which are made from a flexible fluorine-containing sheet material which is permeable to air but not to ink. The material may, for example, be a layer of fluorosilicone or Teflon material about 0.0005 to 0.050 inch thick. When a Teflon membrane is used, the thickness is preferably in the range from 0.0005 to 0.003 inch. When a fluorosilicone membrane is used, it is preferably about 0.003 to 0.012 inch thick.

In order to permit bonding of the fluorine-containing membranes 30 and 31 which are normally resistant to bonding, the surface of the membrane to be bonded is subjected to plasma etching using, for example, a plasma formed from a mixture of hydrogen and argon or hydrogen and nitrogen. Although commercial etchants, such as the Tetraetch etchant marketed by W.L. Gore, may be used, they tend to contaminate the surface with debris which may clog the ink jet orifices. Consequently, plasma etching is preferred. Although only the surface portions which are to be bonded need to be etched, it has been found that etching of the entire membrane surface does not interfere with the scum-inhibiting property of the membrane.

On the other side of the membranes 30 and 31 from the passage 27, air plenums 32 and 33 connected to the air line 22 are provided. Each plenum contains a membrane support 34 consisting, in the illustrated example, of a corrugated or waffled member or screen to support the membrane when the pressure within the plenum is reduced. The air pump 21 is arranged to normally maintain pressure within each plenum at less than about 0.4 atmosphere, and preferably less than about 0.2 atmosphere. In addition, the length and width of the passage 27 are selected so that, during operation of the ink jet head, the ink being supplied thereto is subjected to a reduced pressure within the passage for at least about one-half minute, and preferably for at least one minute. With this arrangement, enough dissolved gas is extracted through the membranes 30 and 31 from the ink within the passage to reduce the dissolved gas content of the ink below the level at which bubbles are formed during normal operation of the ink jet head.

The membranes 30 and 31 and the plenums 32 and 33 may also be arranged to expel ink which may contain gas bubbles through the orifice 35 in the ink jet head 11 when operation of the system is started after a shutdown. For this purpose, the air pump 21 is arranged as described above to supply increased pressure through the line 22 to the dissolved-gas removal device 20. This causes the flexible membranes 30 and 31 to move toward each other. Since the check valve 26 prevents ink from moving back into the reservoir 17, the ink in the passage 27 is forced into the ink jet head 11, expelling any ink therein which may contain gas bubbles through the ink jet orifice 35.

In order to deaerate ink in the ink jet head 11 which may have dissolved gas received through the ink surface exposed to air at the orifice 35, a heater 36 is mounted on the rear wall 37 of an ink jet passage 38 which leads from the ink in the passages 28 and 29 to the orifice 35. The heater 36 is energized to keep the ink in the passage 38 at a higher temperature than the ink in the passage 27. As a result, the ink in the passage 28, which may contain dissolved gas received through the orifice 35 during inactive periods in the operation of the jet, is circulated continuously by convection upwardly through the passage 38 and then through the passage 29 to the dissolved-gas removal passage 27. In the gas removal passage 27, the gas is extracted from the ink as the ink moves downwardly to the passage 28, and it then returns through the passage 28 to the passage 38. In operation, ink from the reservoir 17 which contains dissolved air is transferred to the ink jet head 11 through the passage 27 as the ink jet head operates. The reduced pressure in the plenums 32 and 33 causes dissolved gas in the ink to be extracted from the ink through the membranes 30 and 31. As the dissolved-gas removal device 20 moves in its reciprocal motion, the air pump 21 is operated as necessary by projection of the lever 23 to engage the lug 24 to maintain reduced pressure in the plenums. When it is necessary to expel ink from the ink jet head on start-up of the system, the air pump 21 is arranged to supply increased pressure to the plenums 32 and 33. During nonjetting periods of the ink jet head, the ink circulates convectively through the passages 38, 29, 27 and 28, transporting ink which may contain dissolved gas from the orifice 35 to the gas removal device.

Although the invention has been described herein with reference to a specific embodiment, many modifications and variations therein will readily occur to those skilled in the art. For example, the permeable membrane and air plenum may form one wall of an ink reservoir. Accordingly, all such variations and modifications are included within the intended scope of the invention.

We claim:

1. A device for removing dissolved gas from ink containing dissolved gas and low-molecular-weight components in an ink jet system while preventing formation of scum comprising a gas-permeable, ink-impermeable fluorine-containing membrane which is permeable to dissolved gas in adjacent ink layer but impermeable to low-molecular-weight components of the ink which tend to form scum on the membrane, means for applying ink containing dissolved gas and low-molecular weight components to one side of the fluorine-containing membrane, and means for applying a reduced gas pressure to the other side of the membrane to cause gas to dissolved in ink to be extracted from the ink through the fluorine-containing membrane while preventing passage of low-molecular-weight ink components.

2. A device according to claim 1 wherein the membrane thickness is within the range from about 0.0005 inch to about 0.050 inch.

3. A device according to claim 1 wherein the fluorine-containing membrane comprises a fluorosilicone material.

4. A device according to claim 3 wherein the membrane thickness is within the range from about 0.003 inch to about 0.012 inch.

5. A device according to claim 1 wherein the fluorine-containing membrane comprises a fluorocarbon material.

6. A device according to claim 5 wherein the membrane thickness is in the range from about 0.0005 to about 0.003 inch.

7. A device according to claim 1 wherein the means for applying reduced gas pressure to the other side of the membrane comprises a vacuum plenum.

8. A method for removing dissolved gas from ink containing dissolved gas and low-molecular-weight components in an ink jet system while preventing formation of scum comprising providing a fluorine-containing gas-permeable, ink-impermeable membrane which is permeable to dissolved air in an adjacent ink layer but impermeable to low-molecular-weight components of ink in the layer, applying ink containing dissolved gas and low-molecular-weight components to one side of the fluorine-containing membrane, and applying reduced gas pressure to the other side of the fluorine-containing membrane to extract dissolved gas from the ink while preventing passage of low-molecular-weight ink components.

9. A method according to claim 8 wherein the fluorine-containing membrane comprises a fluorosilicone material.

10. A method according to claim 8 wherein the fluorine-containing membrane comprises a fluorocarbon material.

* * * * *